United States Patent
Oba et al.

(10) Patent No.: US 12,404,180 B2
(45) Date of Patent: Sep. 2, 2025

(54) HIGHLY WEAR-RESISTANT ZEOLITE MOLDED ARTICLE, AND METHOD FOR MANUFACTURING SAME

(71) Applicant: TOSOH CORPORATION, Yamaguchi (JP)

(72) Inventors: Yuki Oba, Yamaguchi (JP); Keisuke Tokunaga, Yamaguchi (JP); Yoju Shimizu, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 677 days.

(21) Appl. No.: 17/780,518

(22) PCT Filed: Nov. 26, 2020

(86) PCT No.: PCT/JP2020/044028
§ 371 (c)(1),
(2) Date: May 27, 2022

(87) PCT Pub. No.: WO2021/107014
PCT Pub. Date: Jun. 3, 2021

(65) Prior Publication Data
US 2022/0411276 A1    Dec. 29, 2022

(30) Foreign Application Priority Data
Nov. 28, 2019  (JP) ................. 2019-214978

(51) Int. Cl.
*C01B 39/20* (2006.01)
*C01B 39/38* (2006.01)

(52) U.S. Cl.
CPC ............. *C01B 39/20* (2013.01); *C01B 39/38* (2013.01)

(58) Field of Classification Search
CPC .................................................. C01B 39/38
See application file for complete search history.

(56) References Cited

U.S. PATENT DOCUMENTS 3,957,689 A * 5/1976 Ostermaier ............. B01J 29/08
502/68

FOREIGN PATENT DOCUMENTS

| CN | 1727443 A | | 2/2006 |
|---|---|---|---|
| JP | S57149818 A | | 9/1982 |
| JP | H1087322 A | | 4/1998 |
| JP | H11314913 A | | 11/1999 |
| JP | 2001226167 A | | 8/2001 |
| JP | 2011201722 A | | 10/2011 |
| JP | 2011201723 A | | 10/2011 |
| JP | 201777541 A | | 4/2017 |
| JP | 2018111643 A | * | 7/2018 |
| JP | 2019141845 A | | 8/2019 |

OTHER PUBLICATIONS

P. Samal, Bulk Properties of Powders, 2015, ASM Handbook, vol. 7, p. 123 (Year: 2015).*
G. Bagheri, Aerodynamics of Volcanic Particles, 2016, pp. 39-52 (Year: 2016).*
Tosoh Zeolite Grades, Retrieved from https://www.tosohusa.com/products--services/zeolites, Accessed Feb. 19, 2025 (Year: 2025).*
Extended European Search report in European Application No. 20894902.4, mailed Jun. 3, 2024, 6pp.
International Preliminary Report on Patentability in PCT/JP2020/044028, dated May 17, 2022, 4pp.

* cited by examiner

*Primary Examiner* — Anthony J Zimmer
*Assistant Examiner* — Jaanzeb C Raja
(74) *Attorney, Agent, or Firm* — HAUPTMAN HAM, LLP

(57) ABSTRACT

A zeolite molded article includes 100 parts by weight of zeolite, 35 parts by weight or more and 70 parts by weight or less of clay, 5 parts by weight or more and 40 parts by weight or less of a silica sol and 0.5 parts by weight or more and 10 parts by weight or less of a water-soluble sodium salt, having an abrasion resistance of 90% or more, an angle of repose of 40° or less, an aerated bulk density on the surface of the zeolite molded article of 0.5 kg/L or more, and a sphericity of the zeolite molded article of 1 or more and 3 or less. The zeolite contains at least one type of zeolite having $Si/Al_2$ of 10 or more and 100,000 or less and a moisture adsorption amount of 10 (g/100 g) or less at 25° C. under a relative pressure of 0.5.

8 Claims, No Drawings

HIGHLY WEAR-RESISTANT ZEOLITE MOLDED ARTICLE, AND METHOD FOR MANUFACTURING SAME

RELATED APPLICATIONS

The present application is a National Phase of International Application No. PCT/JP2020/044028 filed Nov. 26, 2020, which claims priority to Japanese Application No. 2019-214978, filed Nov. 28, 2019.

TECHNICAL FIELD

The present invention relates to a highly wear resistant zeolite molded article and a method for producing it. More particularly, it relates to a highly wear resistant zeolite molded article excellent in high wear resistance and high flowability, and a method for producing it. The highly wear resistant zeolite molded article of the present invention is useful for applications to e.g. adsorbents/separating agents and catalysts.

BACKGROUND ART

In recent years, emission controls on VOCs which are considered as one of causal agents of suspended particulate matters and photochemical oxidants have started, and techniques to regulate VOC discharge attract attention. As a VOC adsorbent, zeolite attracts attention. It has a framework comprising silicon dioxide resistant to heat, and is thereby capable of adsorbing and desorbing VOCs at high temperature and has high safety, and has a large specific surface area. On the other hand, a fixed bed or fluidized bed adsorption tower is utilized for adsorption of VOCs e.g. in a factory, and at the time of packing the adsorption tower and at the time of adsorption/desorption, the adsorbent is likely to be powdered and may cause equipment trouble and pressure loss. Thus, an adsorbent is required to have high wear resistance, however, an invention relating to a zeolite molded article having an applicably high wear resistance has not been achieved yet. Further, at the time of packing the fixed bed or fluidized bed adsorption tower with the adsorbent and recovery of the adsorbent, and in the case of the fluidized bed at the time of adsorption and regeneration too, the flowability of the adsorbent is important. If the agent has low flowability, packing and recovery will take long, and an invention relating to a zeolite molded article having an applicably high flowability has not been achieved yet. As a means to increase strength of the zeolite molded article, several methods have been known. For example, Patent Document 1 discloses a method of mixing, kneading and forming A or X zeolite as zeolite, kaolin clay or hydrated halloysite as a binder, and CMC (carboxymethyl cellulose) as a thickener or water retaining agent.

Patent Document 2 discloses a method of using low silica X zeolite as zeolite, and several types among kaolin clay, sepiolite clay, attapulgite clay and bentonite clay as a binder.

Patent Document 3 discloses a method of mixing 3A zeolite as zeolite, kaolin clay as a binder and a condensed phosphoric acid salt as an inorganic dispersing agent, followed by kneading and forming.

In any of these Patent Documents, an invention relating to a zeolite molded article having applicable wear resistance and flowability has not been achieved yet, and a zeolite molded article having higher wear resistance and flowability has been desired.

PRIOR ART DOCUMENTS

Patent Documents

Patent Document 1: JP-A-H10-87322
Patent Document 2: JP-A-H11-314913
Patent Document 3: JP-A-2001-226167

DISCLOSURE OF INVENTION

Technical Problem

The present invention is to provide a highly wear resistant zeolite molded article which is more excellent in high wear resistance and high flowability as compared with conventional zeolite molded articles, and a method for producing it.

Solution to Problem

The present inventors have conducted extensive studies to achieve the above object and as a result, found a method for producing a zeolite molded article comprising using as a binder two types that is clay and a silica sol, and found it important to control the aerated bulk density of the zeolite molded article and the sphericity of the zeolite molded article in order to improve abrasion resistance of the molded article, and have accomplished the present invention.

That is, the present invention provides the following [1] to [4].

[1] A highly wear resistant zeolite molded article comprising 100 parts by weight of zeolite, 35 parts by weight or more and 70 parts by weight or less of clay, 5 parts by weight or more and 40 parts by weight or less of a silica sol and 0.5 parts by weight or more and 10 parts by weight or less of a water-soluble sodium salt, having an abrasion resistance of 90% or more, an angle of repose of 40° or less, an aerated bulk density on the surface of the zeolite molded article of 0.5 kg/L or more, and a sphericity of the zeolite molded article of 1 or more and 3 or less, wherein the zeolite contains at least one type of zeolite having $Si/Al_2$ of 10 or more and 100,000 or less and a moisture adsorption amount of 10 (g/100 g) or less at 25° C. under a relative pressure of 0.5.

[2] The highly wear resistant zeolite molded article according to the above [1], wherein the zeolite contains at least one member of β zeolite, Y zeolite, L zeolite, ferrierite zeolite, mordenite zeolite and ZSM-5 zeolite.

[3] A method for producing the highly wear resistant zeolite molded article as defined in the above [1] or [2], which comprises mixing 100 parts by weight of zeolite with 35 parts by weight or more and 70 parts by weight or less of clay, 5 parts by weight or more and 40 parts by weight or less of a silica sol, 0.5 parts by weight or more and 10 parts by weight or less of a water-soluble sodium salt, 4 parts by weight or more and 20 parts by weight or less of a forming aid and 120 parts by weight or more and 180 parts by weight or less of water, kneading the mixture to obtain a kneaded product, forming the kneaded product at a rotation frequency of 300 rpm or more, followed by drying to obtain a zeolite molded article, and firing the zeolite molded article at 400° C. or higher and 700° C. or lower, wherein the zeolite contains at least one type of zeolite having $Si/Al_2$ of 10 or more and 100,000 or less and a moisture adsorption amount of 10 (g/100 g) or less at 25° C. under a relative pressure of 0.5.

[4] The method for producing the highly wear resistant zeolite molded article according to the above [3], wherein the zeolite contains at least one member of β zeolite, Y zeolite, L zeolite, ferrierite zeolite, mordenite zeolite and ZSM-5 zeolite.

Advantageous Effects of Invention

The highly wear resistant zeolite molded article of the present invention, which has high wear resistance and high flowability, is useful for applications to adsorption/separation including thermal regeneration process, and applications to catalytic reaction.

DESCRIPTION OF EMBODIMENTS

Now, the present invention will be described in detail.

The highly wear resistant zeolite molded article of the present invention comprises 100 parts by weight of zeolite, and 35 parts by weight or more and 70 parts by weight or less of clay, 5 parts by weight or more and 40 parts by weight or less of a silica sol and 0.5 parts by weight or more and 10 parts by weight or less of a water-soluble sodium salt.

The amount of the clay contained in the highly wear resistant zeolite molded article is 35 parts by weight or more and 70 parts by weight or less per 100 parts by weight of zeolite (calculated as anhydrous zeolite). If it is less than 35 parts by weight, the wear resistance tends to be low, and if it is more than 70 parts by weight, no further improvement of the wear resistance will be confirmed any more. In order to achieve higher wear resistance, it is preferably 40 parts by weight or more and 60 parts by weight or less, more preferably 45 parts by weight or more and 55 parts by weight or less. The particle size of the clay is not particularly limited, and preferably the average particle size is 0.5 μm or more and 30 μm or less. The clay may, for example, be sepiolite clay, attapulgite clay, palygorskite clay or bentonite clay.

The amount of the silica sol contained in the highly wear resistant zeolite molded article is 5 parts by weight or more and 40 parts by weight or less per 100 parts by weight of zeolite (calculated as anhydrous zeolite). If it is less than 5 parts by weight, no effect will be obtained on the wear resistance, and as the amount of the silica sol increases, the wear resistance increases, however, if it is more than 40 parts by weight, extrusion property will remarkably deteriorate. In order to maintain both wear resistance and extrusion property at high levels, it is preferably 10 parts by weight or more and 30 parts by weight or less, more preferably 15 parts by weight or more and 25 parts by weight or less. The particle size of the silica sol is not particularly limited, and preferably the average particle size is 5 nm or more and 30 nm or less.

The amount of the water-soluble sodium salt contained in the highly wear resistant zeolite molded article is 0.5 parts by weight or more and 10 parts by weight or less per 100 parts by weight of zeolite (calculated as anhydrous zeolite). If it is less than 0.5 parts by weight, no sufficient effect will be obtained, and even if it is larger than 10 parts by weight, no higher effect will be obtained any more. In order not to increase the amount of sodium derived from the water-soluble sodium salt, it is preferably 0.5 parts by weight or more and 8 parts by weight or less, more preferably 0.5 parts by weight or more and 6 parts by weight or less. The water-soluble sodium salt may, for example, be an inorganic acid sodium salt or an organic acid sodium salt.

The inorganic acid sodium salt may be a water-soluble sodium salt and may, for example, be sodium phosphate, sodium silicate or sodium aluminate. Among them, sodium phosphate is preferred. The sodium phosphate may, for example, be sodium dihydrogenphosphate, disodium hydrogenphosphate, trisodium phosphate, sodium pyrophosphate, disodium dihydrogenpyrophosphate, sodium tripolyphosphate, sodium tetrapolyphosphate or sodium hexametaphosphate.

The organic acid sodium salt may be a water-soluble sodium salt, and a general organic carboxylic acid, amino carbonate, an ether carboxylic acid salt or a vinyl polymer sodium salt may, for example, be mentioned. The general organic carboxylic acid may, for example, be sodium citrate, sodium gluconate, sodium oxalate or sodium tartrate, the amino carbonate may, for example, be sodium ethylenediaminetetraacetate or sodium diethylenetriaminepentaacetate, the ether carboxylic acid salt may, for example, be sodium carboxymethyl tartronate or sodium carboxymethyloxysuccinate, and the vinyl polymer sodium salt may, for example, be sodium polyacrylate or a sodium salt of an acrylic acid/maleic acid copolymer.

The highly wear resistant zeolite molded article of the present invention has an abrasion resistance of 90% or more. If it has an abrasion resistance of less than 90%, it will easily be powdered and is likely to bring about pressure loss. The abrasion resistance may be measured in accordance with JIS K1474, Test methods for activated carbon (see (<Wear resistance test> in Examples). The abrasion resistance is preferably 92% or more, more preferably 95% or more, particularly preferably 96.5% or more.

The highly wear resistant zeolite molded article of the present invention has an angle of repose of 40° or less. If the angle of repose is more than 40°, the molded article tends to be inferior in flowability, and packing and recovery of the molded article may take long. The angle of repose is measured in accordance with <Measurement of angle of repose> in Examples. The angle of repose is preferably 38° or less, more preferably 36° or less, particularly preferably 32° or less.

The highly wear resistant zeolite molded article of the present invention has an aerated bulk density of 0.58 kg/L or more. If the aerated bulk density is less than 0.5 kg/L, the abrasion resistance will remarkably lower, and pressure loss accompanying powdering is likely to occur. The aerated bulk density is measured in accordance with <Measurement of aerated bulk density> in Examples.

The highly wear resistant zeolite molded article of the present invention has a sphericity of 1 or more and 3 or less. If the sphericity is more than 3, abrasion resistance and flowability will remarkably lower, and e.g. pressure loss accompanying powdering is likely to occur. The sphericity is measured in accordance with <Measurement of Sphericity> in Examples.

The zeolite contained in the highly wear resistant zeolite molded article has $Si/Al_2$ of 10 or more and 100,000 or less and a moisture adsorption among of 10 (g/100 g) or less at 25° C. under a relative pressure of 0.5, and at least one type of such zeolite is contained. If $Si/Al_2$ is less than 10, or the moisture adsorption amount is more than 10 (g/100 g) at 25° C. under a relative humidity of 0.5, abrasion resistance tends to decrease. $Si/Al_2$ is preferably 50 or more and 10,000 or less, more preferably 80 or more and 2,000 or less. The type of the zeolite may, for example, be β zeolite, Y zeolite, L zeolite, ferrierite zeolite, mordenite zeolite or ZSM-5 zeolite, and is preferably Y zeolite or ZSM-5 zeolite.

The method for producing the highly wear resistant zeolite molded article of the present invention (hereinafter sometimes referred to as "the production method of the present invention") comprises mixing 100 parts by weight of zeolite with 35 parts by weight or more and 70 parts by weight or less of clay, 5 parts by weight or more and 40 parts by weight or less of a silica sol, 0.5 parts by weight or more and 10 parts by weight or less of a water-soluble sodium salt, 4 parts by weight or more and 20 parts by weight or less of a forming aid and 120 parts by weight or more and 180 parts by weight or less of water, kneading the mixture to obtain a kneaded product, forming the kneaded product at a rotation frequency of 300 rpm or more, followed by drying to obtain a zeolite molded article, and firing the zeolite molded article at 400° C. or higher and 700° C. or lower.

It is the clay that is contained in the kneaded product used in the production method of the present invention. The clay may, for example, be sepiolite clay, attapulgite clay, palygorskite clay or bentonite clay. The amount of the clay is 35 parts by weight or more and 70 parts by weight or less per 100 parts by weight of zeolite (calculated as anhydrous zeolite). If it is less than 35 parts by weight, the wear resistance tends to be low, and even if it is more than 70 parts by weight, no further improvement of the wear resistance will be confirmed any more. In order to achieve higher wear resistance, it is preferably 40 parts by weight or more and 60 parts by weight or less, more preferably 45 parts by weight or more and 55 parts by weight or less. The particle size of the clay is not particularly limited, and preferably the average particle size is 0.5 μm or more and 30 μm or less.

It is the silica sol that is contained in the kneaded product used in the production method of the present invention. The amount of the silica sol is 5 parts by weight or more and 40 parts by weight or less per 100 parts by weight of zeolite (calculated as anhydrous zeolite). If it is less than 5 parts by weight, no effect will be obtained on the wear resistance, and as the amount of the silica sol increases, the wear resistance increases, however, if it is more than 40 parts by weight, extrusion property will remarkably deteriorate. In order to maintain both wear resistance and extrusion property at high levels, it is preferably 10 parts by weight or more and 30 parts by weight or less, more preferably 15 parts by weight or more and 25 parts by weight or less. The particle size of the silica sol is not particularly limited, and preferably the average particle size is 5 nm or more and 30 nm or less. The pH is not particularly limited and is preferably 7.0 or higher and 10.0 or lower.

It is the water-soluble sodium salt that is contained in the kneaded product used in the production method of the present invention. The water-soluble sodium salt may, for example, be an inorganic acid sodium salt or an organic acid sodium salt. The water-soluble sodium salt preferably contains at least one member of the inorganic acid sodium salt and the organic acid sodium salt. Although the reason is not clearly understood, by using the water-soluble sodium salt, the wear resistance will be remarkably high. The amount of the water-soluble sodium salt is 0.5 parts by weight or more and 10 parts by weight or less per 100 parts by weight of zeolite (calculated as anhydrous zeolite). If it is less than 0.5 parts by weight, no sufficient effects will be obtained, and even if it is more than 10 parts by weight, no higher effects will be obtained any more. In order not to increase the amount of sodium derived from the water-soluble sodium salt, it is preferably 0.5 parts by weight or more and 8 parts by weight or less, more preferably 0.5 parts by weight or more and 6 parts by weight or less.

The inorganic acid sodium salt may be a water-soluble sodium salt and may, for example, be sodium phosphate, sodium silicate or sodium aluminate. Among them, sodium phosphate is preferably used, which can easily be handled. As the sodium phosphate, sodium dihydrogenphosphate, disodium hydrogenphosphate, trisodium phosphate, sodium pyrophosphate, disodium dihydrogen pyrophosphate, sodium tripolyphosphate, sodium tetrapolyphosphate, or sodium hexametaphosphate may, for example, be used.

The organic acid sodium salt may be a water-soluble sodium salt and a general organic carboxylic acid, amino carbonate, an ether carboxylic acid salt or a vinyl polymer sodium salt may, for example, be mentioned. As the organic acid carboxylic acid, sodium citrate, sodium gluconate, sodium oxalate or sodium tartrate may, for example, be used, as the amino carbonate, sodium ethylenediaminetetraacetate or sodium diethylenetriaminepentaacetate may, for example, be used, as the ether carboxylic acid salt, sodium carboxymethyl tartronate or sodium carboxymethyloxysuccinate may, for example, be used, and as the vinyl polymer sodium salt, sodium polyacrylate or a sodium salt of an acrylic acid/maleic acid copolymer may, for example, be used.

It is the forming aid that is contained in the kneaded product used in the production method of the present invention. The forming aid is to improve formability and may, for example, be cellulose, an alcohol, lignin, starch or guar gum. Among them, cellulose or an alcohol is preferred, which can be easily handled. The cellulose may, for example, crystalline cellulose, hydroxypropylmethyl cellulose or carboxymethyl cellulose (CMC) sodium salt. The alcohol may, for example, be polyvinyl alcohol or ethylene glycol. The amount of the forming aid is 4 parts by weight or more and 20 parts by weight or less, preferably 8 parts by weight or more and 16 parts by weight or less per 100 parts by weight of zeolite (calculated as anhydrous zeolite). If it is less than 4 parts by weight, the wear resistance tends to be low, and if it is more than 20 parts by weight, formability will remarkably lower.

The amount of water contained in the kneaded product used in the production method of the present invention is 120 parts by weight or more and 180 parts by weight or less, preferably 140 parts by weight or more and 160 parts by weight or less per 100 parts by weight of zeolite (calculated as anhydrous zeolite). If it is less than 120 parts by weight or more than 180 parts by weight, forming may sometimes be difficult.

The zeolite contained in the kneaded product used in the production method of the present invention has to contain at least one type of zeolite having $Si/Al_2$ of 10 or more and 100,000 or less and a moisture adsorption amount of 10 (g/100 g) or less at 25° C. under a relative pressure of 0.5. If $Si/Al_2$ is less than 10, or the moisture adsorption amount is more than 10 (g/100 g) at 25° C. under a relative pressure of 0.5, the highly wear resistant zeolite molded article tends to adsorb moisture in the air and tends to have lowered abrasion resistance. $Si/Al_2$ is preferably 50 or more and 10,000 or less, more preferably 80 or more and 2,000 or less. The type of the zeolite may, for example, be β zeolite, Y zeolite, L zeolite, ferrierite zeolite, mordenite zeolite or ZSM-5 zeolite, and is preferably Y zeolite or ZSM-5 zeolite.

The kneaded product used in the production method of the present invention is obtained by mixing 100 parts by weight of the zeolite with 35 parts by weight or more and 70 parts by weight or less of the clay, 5 parts by weight or more and 40 parts by weight or less of the silica sol, 0.5 parts by weight or more and 10 parts by weight or less of the water-soluble sodium salt, 4 parts by weight or more and 20 parts by weight or less of the forming aid and 120 parts by weight or more and 180 parts by weight or less of water, followed by kneading. The mixing and kneading method is not particularly limited, and for example, a roll kneading machine Mix-muller, a blade stirring Henschel mixer, or a batch or continuous kneader may be used.

In the production method of the present invention, the kneaded product obtained as above is formed at a rotation frequency of 300 rpm or more. More particularly, the obtained kneaded product is formed into cylinders, which are subjected to a forming machine at a rotation frequency of 300 rpm or more. If the rotation frequency is less than 300 rpm, the sphericity tends to be high, and the abrasion resistance tends to be low. The rotation frequency is preferably 450 rpm or more, more preferably 600 rpm or more.

As a method of forming the kneaded product into cylinders, for example, rolling granulation, stirring granulation, extrusion or spray granulation may be mentioned, and extrusion is preferred.

As a forming machine used in the forming method at a rotation frequency of 300 rpm or more, for example, a forming machine of e.g. rolling granulation, rolling sizing, stirring granulation and spray granulation may be mentioned, and a rolling sizing forming machine is preferred.

The shape of the molded article obtained by the production method of the present invention is not particularly limited and is preferably e.g. spherical (including substantially spherical, the same applies hereinafter), cylindrical, elliptic, barrel-shaped, trefoil, or ring-form, and is more preferably spherical or cylindrical. The size of the molded article is not particularly limited, and preferably the average particle size is 0.1 μm or more and 3 mm or less. To improve the yield at the time of forming, preliminary drying may, for example, be mentioned. Preliminary drying may be conducted e.g. by air drying, vibration drying, roll granulation, surface drying or a combination of two or more of them. The moisture content after preliminary drying may be such a moisture content that forming is possible after preliminary drying, and is preferably 40% or more and 60% or less.

The formed zeolite molded article is dried. The drying method is not particularly limited, and for example, a box dryer or a continuous dryer may be used. The drying temperature is 50° C. or higher and 200° C. or lower. The drying may be conducted in an air or nitrogen atmosphere under atmospheric pressure. The dried zeolite molded article is classified into desired sized. The classification may be conducted prior to drying.

The dried zeolite molded article is fired. The firing method is not particularly limited, and may be conducted, for example, by a box muffle furnace, a rotary kiln or a shaft kiln. The firing temperature is not limited so long as fibrous clay is sintered to exhibit strength, and is preferably 400° C. or higher and 700° C. or lower. The firing may be conducted in an air or nitrogen atmosphere under atmospheric pressure.

EXAMPLES

Now, the present invention will be described in further detail with reference to Examples, however, it should be understood that the present invention is by no means restricted to such specific Examples.

<Measurement of Moisture Adsorption Amount>

The moisture adsorption amount was measured by using a spring balance adsorption apparatus at a temperature of 25° C.

<Wear Resistance Test>

The abrasion resistance was measured by wear resistance test in accordance with JIS K1474. That is, a 200 mL measuring cylinder was packed with the sample to a marked line of 100 mL by lightly tapping the measuring cylinder. The sample measured by the measuring cylinder was put in a wear resistance test dish together with 15 steel balls having a diameter of 12.7 mm and 15 steel balls having a diameter of 9.5 mm. The test dish was attached to a sieve shaker and shaken for 30 minutes. Using the sieve with a mesh size half the mesh size of the sieve on which the sample remained the most, and a receiver, the entire sample having the steel balls removed was put, and attached to a sieve shaker. After shaking for 3 minutes, the masses remaining on the sieve and the receiver were weighed to the 0.1 g digit. The abrasion resistance was calculated in accordance with the following formula 1:

$$H = W/S \times 100 \qquad \text{Formula 1}$$

H: abrasion resistance (mass fraction %), W: mass (g) of sample remaining on the sieve, S: total mass (g) of the sample remining on the sieve and the receiver.

<Measurement of Angle of Repose>

The angle of repose was measured by using Powder Tester (manufactured by Hosokawa Micron).

<Measurement of Aerated Bulk Density>

About 100 g of a sample weighed with an accuracy of 0.1% was gently put in a dry 250 mL measuring cylinder (minimum scale: 2 mL) without being compacted. If necessary, the top surface of the powder layer was carefully smoothed without being compacted, and the aerated bulk volume was read to the minimum scale, and from the read bulk volume, the aerated bulk density (kg/L) was calculated.

<Measurement of Sphericity>

To measure the sphericity, the zeolite molded article was microphotographed by a digital microscope (VHX-5000, manufactured by KEYENCE CORPORATION), and the major axis and the minor axis of the zeolite molded article were measured. From the measured major axis and minor axis, the sphericity (major axis/minor axis) was calculated. The average value of measured values of 50 zeolite molded articles was taken as the sphericity.

Example 1

80 parts by weight (1627 g, moisture content: 2%) of Y zeolite powder (HSZ (registered trademark) –385HUA, manufactured by Tosoh Corporation ($Si/Al_2$: 100, moisture adsorption amount: 2 g/100 g)), 20 parts by weight (413 g, moisture content: 3%) of MFI zeolite powder (HSZ (registered trademark) –891HOA, manufactured by Tosoh Corporation ($Si/Al_2$: 1500, the moisture adsorption amount: 4 g/100 g)), 50 parts by weight (1253 g, moisture content: 22%) of attapulgite clay (Min-U-Gel MB, manufactured by Active Minerals International, LLC), 6 parts by weight (120 g) of sodium carboxymethylcellulose (forming aid, CELLOGEN, manufactured by DKS Co., Ltd.) and 6 parts by weight (120 g) of crystalline cellulose (CEOLUS (registered trademark) RC-591, manufactured by Asahi Kasei Chemicals) were weighed and mixed by Mix-muller (manufactured by SINTOKOGIO LTD.) for 5 minutes. 1639 g of silica sol (SNOWTEX C-30, average particle size: 12 nm, pH: 8.7, manufactured by Nissan Chemical Corporation) was added, followed by mixing for 5 minutes. A solution having 1.5 parts by weight (30 g) of sodium dihydrogen phosphate ($NaH2PO4$, manufactured by RIN KAGAKU KOGYO Co., Ltd.) dissolved in 1000 g of water was added, followed by mixing for 5 minutes. 960 g of water was further added, followed by stirring for 80 minutes to obtain a kneaded product. The ignition loss of the obtained kneaded product was measured at 650° C. for 1 hour, whereupon it was 103 part by weight per 100 parts by weight of zeolite. The obtained kneaded product was formed into cylinders having a diameter of 0.6 mm, followed by rolling sizing by Marumerizer (QJ-400, manufactured by DALTON CORPORATION) at a rotation frequency of 900 rpm to form the cylinders into spheres. The spheres were dried at 100° C. for 12 hours or more and fired at 650° C. for 3 hours to obtain a zeolite molded article (per 100 parts by weight of zeolite, clay: 50 parts by weight, silica sol: 25 parts by weight, water-soluble sodium salt: 1.5 parts by weight, $Si/Al_2$ of zeolite (385HUA): 100, $Si/Al_2$ of zeolite (891HOA): 1500, moisture adsorption amount of zeolite (385HUA): 2 g/100 g, moisture adsorption amount of zeolite (891HOA): 4 g/100 g). The zeolite molded article had an angle of repose of 31°, an aerated bulk density of 0.59 kg/L, and the sphericity was 1.3.

The abrasion resistance after the wear resistance test was conducted was 95.5%.

Example 2

A kneaded product was obtained in the same manner as in Example 1. The ignition loss of the obtained kneaded product was measured at 650° C. for 1 hour, whereupon it was 103 parts by weight per 100 parts by weight of zeolite. The obtained kneaded product was formed into cylinders having a diameter of 0.6 mm, followed by rolling sizing by Marumerizer (QJ-400, manufactured by DALTON CORPORATION) at a rotation frequency of 600 rpm to form the cylinders into spheres. The spheres were dried at 100° C. for 12 hours or more and fired at 650° C. for 3 hours to obtain a zeolite molded article (per 100 parts by weight of zeolite, clay: 50 parts by weight, silica sol: 25 parts by weight, water-soluble sodium salt: 1.5 parts by weight, $Si/Al_2$ of zeolite (385HUA): 100, $Si/Al_2$ of zeolite (891HOA): 1500, moisture adsorption amount of zeolite (385HUA): 2 g/100 g, moisture adsorption amount of zeolite (891 HOA): 4 g/100 g). The zeolite molded article had an angle of repose of 36°, an aerated bulk density of 0.56 kg/L, and the sphericity was 1.6.

The abrasion resistance after the wear resistance test was conducted was 92.9%.

Example 3

A kneaded product was obtained in the same manner as in Example 1. The ignition loss of the obtained kneaded product was measured at 650° C. for 1 hour, whereupon it was 103 parts by weight per 100 parts by weight of zeolite. The obtained kneaded product was formed into cylinders having a diameter of 0.6 mm, followed by rolling sizing by Marumerizer (QJ-400, manufactured by DALTON CORPORATION) at a rotation frequency of 300 rpm to form the cylinders into spheres. The spheres were dried at 100° C. for 12 hours or more and fired at 650° C. for 3 hours to obtain a zeolite molded article (per 100 parts by weight of zeolite, clay: 50 parts by weight, silica sol: 25 parts by weight, water-soluble sodium salt: 1.5 parts by weight, $Si/Al_2$ of zeolite (385HUA): 100, $Si/Al_2$ of zeolite (891HOA): 1500, moisture adsorption amount of zeolite (385HUA): 2 g/100 g, moisture adsorption amount of zeolite (891HOA): 4 g/100 g). The zeolite molded article had an angle of repose of 38°, an aerated bulk density of 0.52 kg/L, and the sphericity was 2.6.

The abrasion resistance after the wear resistance test was conducted was 90.8%.

Example 4

A mixture was obtained in the same manner as in Example 1 except that a Henschel mixer was used as a kneading machine. The ignition loss of the obtained mixture was measured at 650° C. for 1 hour, whereupon it was 101 parts by weight per 100 parts by weight of zeolite. The obtained mixture was formed into cylinders having a diameter of 0.6 mm, followed by rolling sizing by Marumerizer (QJ-400, manufactured by DALTON CORPORATION) at a rotation frequency of 900 rpm to form the cylinders into spheres. The spheres were dried at 100° C. for 12 hours or more and fired at 650° C. for 3 hours to obtain a zeolite molded article (per 100 parts by weight of zeolite, clay: 50 parts by weight, silica sol: 25 parts by weight, water-soluble sodium salt: 1.5 parts by weight, $Si/Al_2$ of zeolite (385HUA): 100, $Si/Al_2$ of zeolite (891HOA): 1500, moisture adsorption amount of zeolite (385HUA): 2 g/100 g, moisture adsorption amount of zeolite (891HOA): 4 g/100 g). The zeolite molded article had an angle of repose of 31°, an aerated bulk density of 0.59, and the sphericity was 1.3.

The abrasion resistance after the wear resistance test was conducted was 92.3%.

Example 5

A mixture was obtained in the same manner as in Example 1 except that the amount of the silica sol was 10 parts by weight (653 g), the amount of the sodium carboxymethylcellulose was 4 parts by weight (80 g), the amount of the crystalline cellulose (CEOLUS (registered trademark) RC-591, manufactured by Asahi Kasei Chemicals) was 4 parts by weight (80 g), and the amount of water added was 1350 g.

The ignition loss of the obtained kneaded product was measured at 650° C. for 1 hour, whereupon it was 95 parts by weight per 100 parts by weight of zeolite. The obtained kneaded product was formed into cylinders having a diameter of 0.6 mm, followed by rolling sizing by Marumerizer (QJ-400, manufactured by DALTON CORPORATION) at a rotation frequency of 900 rpm to form the cylinders into spheres. The spheres were dried at 100° C. for 12 hours or more and fired at 650° C. for 3 hours to obtain a zeolite molded article (per 100 parts by weight of zeolite, clay: 50 parts by weight, silica sol: 10 parts by weight, water-soluble sodium salt: 1.5 parts by weight, $Si/Al_2$ of zeolite (385HUA): 100, $Si/Al_2$ of zeolite (891HOA): 1500, moisture adsorption amount of zeolite (385HUA): 2 g/100 g, moisture adsorption amount of zeolite (891HOA): 4 g/100 g). The zeolite molded article had an angle of repose of 28°, an aerated bulk density of 0.65, and the sphericity was 1.4.

The abrasion resistance after the wear resistance test was conducted was 94.0%.

Example 6

A kneaded product was obtained in the same manner as in Example 1. The ignition loss of the obtained kneaded product was measured at 650° C. for 1 hour, whereupon it was 103 parts by weight per 100 parts by weight of zeolite. The obtained kneaded product was formed into cylinders having a diameter of 0.6 mm, followed by preliminary drying by a turbo comminutor to adjust the moisture content to 49%, and followed by rolling sizing by Marumerizer (QJ-400, manufactured by DALTON CORPORATION) at a rotation frequency of 300 rpm to form the cylinders into spheres. The spheres were dried at 100° C. for 12 hours or more and fired at 650° C. for 3 hours to obtain a zeolite molded article (per 100 parts by weight of zeolite, clay: 50 parts by weight, silica sol: 25 parts by weight, water-soluble sodium salt: 1.5 parts by weight, $Si/Al_2$ of zeolite (385HUA): 100, $Si/Al_2$ of zeolite (891HUA): 1500, moisture adsorption amount of zeolite (385HUA): 2 g/100 g, moisture adsorption amount of zeolite (891HOA): 4 g/100 g). The zeolite molded article had an angle of repose of 28°, an aerated bulk density of 0.58 kg/L, and the sphericity was 1.5.

The abrasion resistance after the wear resistance test was conducted was 94.2%.

Comparative Example 1

A kneaded product was obtained in the same manner as in Example 1. The ignition loss of the obtained kneaded product was measured at 650° C. for 1 hour, whereupon it was 103 parts by weight per 100 parts by weight of zeolite. The obtained kneaded product was formed into cylinders having a diameter of 0.6 mm, followed by rolling sizing by Marumerizer (QJ-400, manufactured by DALTON CORPORATION) at a rotation frequency of 100 rpm to form the cylinders into spheres. The spheres were dried at 100° C. for 12 hours or more and fired at 650° C. for 3 hours to obtain a zeolite molded article (per 100 parts by weight of zeolite, clay: 50 parts by weight, silica sol: 25 parts by weight, water-soluble sodium salt: 1.5 parts by weight, $Si/Al_2$ of zeolite (385HUA): 100, $Si/Al_2$ of zeolite (891HOA): 1500, moisture adsorption amount of zeolite (385HUA): 2 g/100 g, moisture adsorption amount of zeolite (891HOA): 4 g/100 g). The zeolite molded article had an angle of repose of 42°, an aerated bulk density of 0.47 kg/L, and the sphericity was 3.1.

The abrasion resistance after the wear resistance test was conducted was 86.3%.

Comparative Example 2

A kneaded product was obtained in the same manner as in Example 1 except that no silica sol was added, the amount of the sodium carboxymethylcellulose was 4 parts by weight (80 g), the amount of the crystalline cellulose (CEOLUS (registered trademark) RC-591, manufactured by Asahi Kasei Chemicals) was 4 parts by weight (80 g), and the amount of water added was 1740 g. The ignition loss of the obtained kneaded product was measured at 650° C. for 1 hour, whereupon it was 95 parts by weight per 100 parts by weight of zeolite. The obtained kneaded product was formed into cylinders having a diameter of 0.6 mm, followed by rolling sizing by Marumerizer (QJ-400, manufactured by DALTON CORPORATION) at a rotation frequency of 900 rpm to form the cylinders into spheres. The spheres were dried at 100° C. for 12 hours or more and fired at 650° C. for 3 hours to obtain a zeolite molded article (per 100 parts by weight of zeolite, clay: 50 parts by weight, silica sol: 0 parts by weight, water-soluble sodium salt: 1.5 parts by weight, $Si/Al_2$ of zeolite (385HUA): 100, $Si/Al_2$ of zeolite (891HUA): 1500, moisture adsorption amount of zeolite (385HUA): 2 g/100 g, moisture adsorption amount of zeolite (891HUA): 4 g/100 g). The zeolite molded article had an angle of repose of 31°, an aerated bulk density of 0.55 kg/L, and the sphericity was 1.3.

The abrasion resistance after the wear resistance test was conducted was 84.9%.

The entire disclosure of Japanese Patent Application No. 2019-214978 filed on Nov. 28, 2019 including specification, claims, drawings and summary is incorporated herein by reference in its entirety.

INDUSTRIAL APPLICABILITY

The highly wear resistant zeolite molded article of the present invention is excellent in wear resistance, and is thereby used for applications to adsorbents/separating agents, catalysts, etc., without bringing about equipment trouble and pressure loss, and is excellent in flowability, whereby packing, recovery, etc. can readily be conducted at the time of use for a fixed bed or fluidized bed adsorption tower.

The invention claimed is:

1. A highly wear resistant zeolite molded article comprising 100 parts by weight of zeolite, 35 parts by weight or more and 70 parts by weight or less of clay, 5 parts by weight or more and 40 parts by weight or less of a silica sol and 0.5 parts by weight or more and 10 parts by weight or less of a water-soluble sodium salt, having an abrasion resistance of 90% or more, an angle of repose of 40° or less, an aerated bulk density of the surface of the zeolite molded article of 0.5 kg/L or more, and a sphericity of the zeolite molded article of 1 or more and 3 or less, wherein the zeolite contains at least one type of zeolite having $Si/Al_2$ of 10 or more and 100,000 or less and a moisture adsorption amount of 10 (g/100 g) or less at 25° C. under a relative pressure of 0.5.

2. The highly wear resistant zeolite molded article according to claim 1, wherein the zeolite contains at least one member of β zeolite, Y zeolite, L zeolite, ferrierite zeolite, mordenite zeolite and ZSM-5 zeolite.

3. A method for producing the highly wear resistant zeolite molded article as defined in claim 1, which comprises mixing 100 parts by weight of zeolite with 35 parts by weight or more and 70 parts by weight or less of clay, 5 parts by weight or more and 40 parts by weight or less of a silica sol, 0.5 parts by weight or more and 10 parts by weight or less of a water-soluble sodium salt, 4 parts by weight or more and 20 parts by weight or less, of a forming aid and 120 parts by weight or more and 180 parts by weight or less of water, kneading the mixture to obtain a kneaded product, forming the kneaded product at a rotation frequency of 300 rpm or more, followed by drying to obtain a zeolite molded article, and firing the zeolite molded article at 400° C. or higher and 700° C. or lower, wherein the zeolite contains at least one type of zeolite having $Si/Al_2$ of 10 or more and 100,000 or less and a moisture adsorption amount of 10 (g/100 g) or less at 25° C. under a relative pressure of 0.5.

4. The method for producing the highly wear resistant zeolite molded article according to claim 3, wherein the zeolite contains at least one member of B zeolite, Y zeolite, L zeolite, ferrierite zeolite, mordenite zeolite and ZSM-5 zeolite.

5. The highly wear resistant zeolite molded article according to claim 1, wherein the silica sol is 15 parts by weight or more and 25 parts by weight or less.

6. The highly wear resistant zeolite molded article according to claim 1, wherein a particle size of the silica sol ranges from 5 nanometers (nm) to 30 nm.

7. The highly wear resistant zeolite molded article according to claim 1, wherein a pH of the silica sol is 7 or greater.

8. The highly wear resistant zeolite molded article according to claim 1, wherein a pH of the silica sol is 10 or lower.

\* \* \* \* \*